United States Patent [19]
Obata et al.

[11] Patent Number: 5,083,287
[45] Date of Patent: Jan. 21, 1992

[54] METHOD AND APPARATUS FOR APPLYING A SHADOWING OPERATION TO FIGURES TO BE DRAWN FOR DISPLAYING ON CRT-DISPLAY

[75] Inventors: Koei Obata; Takashige Kai, both of Kusatsu, Japan

[73] Assignee: Daikin Industries, Inc., Osaka, Japan

[21] Appl. No.: 379,941

[22] Filed: Jul. 14, 1989

[30] Foreign Application Priority Data

Jul. 14, 1988 [JP] Japan .................. 63-175778
Apr. 17, 1989 [JP] Japan .................. 64-97239

[51] Int. Cl.$^5$ .................................. G09B 9/08
[52] U.S. Cl. .............................. 395/126; 395/120
[58] Field of Search ............. 364/518, 521, 522; 340/721, 723, 729, 734

[56] References Cited
U.S. PATENT DOCUMENTS 4,625,289 11/1986 Rockwood .................. 364/522
4,819,192 4/1989 Kuragano et al. ........... 364/522

Primary Examiner—Heather R. Herndon
Attorney, Agent, or Firm—Beveridge, DeGrandi & Weilacher

[57] ABSTRACT

Discrimination of the condition of polygons is carried out by performing coordinate transformation from a view reference coordinate to a light source coordinate for each polygon. Then shadowing is carried out for every pixel of the polygon which is to be partially shaded. Also when multiple light sources exist, detection of the polygon is carried out by performing a coordinate transformation to each light source coordinate system for each polygon to be subjected to a shadowing operation. The detection includes detecting whether or not each polygon is the most light source side from among several polygons, thereafter intensity for display of each pixel is obtained based upon every detection result corresponding to each light source coordinate system.

20 Claims, 13 Drawing Sheets

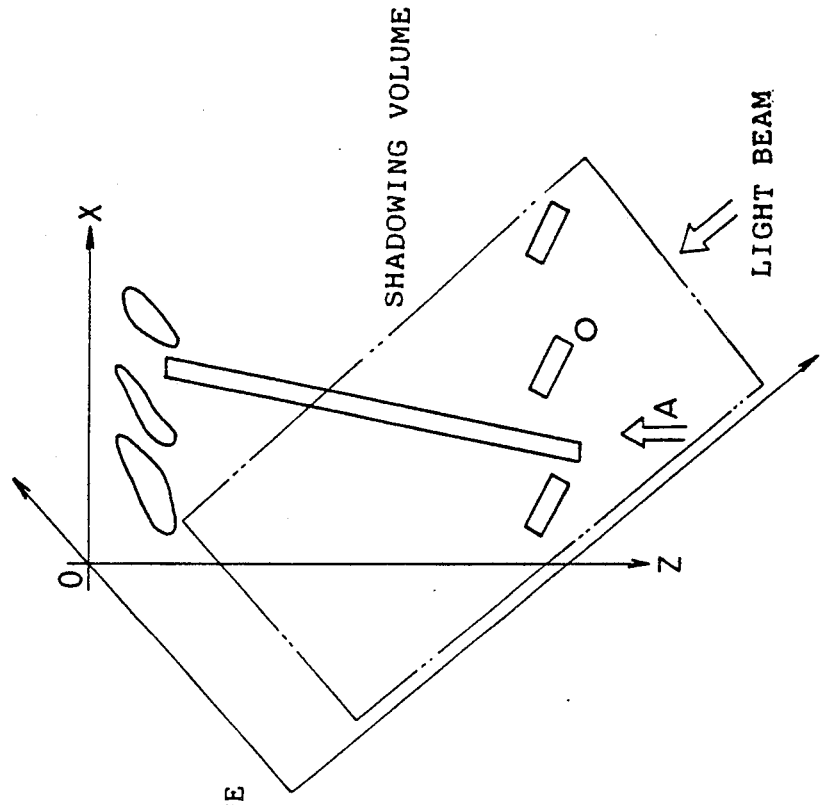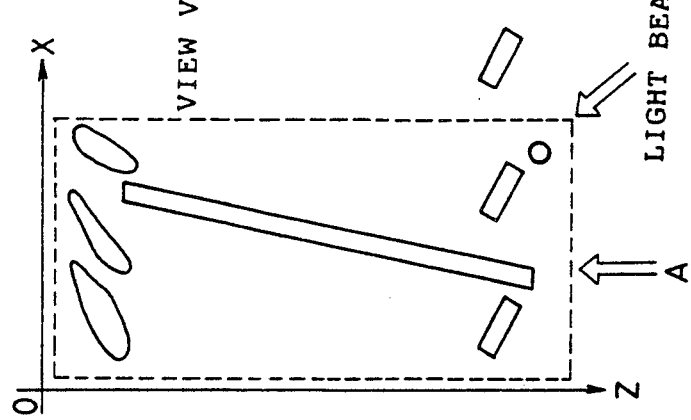

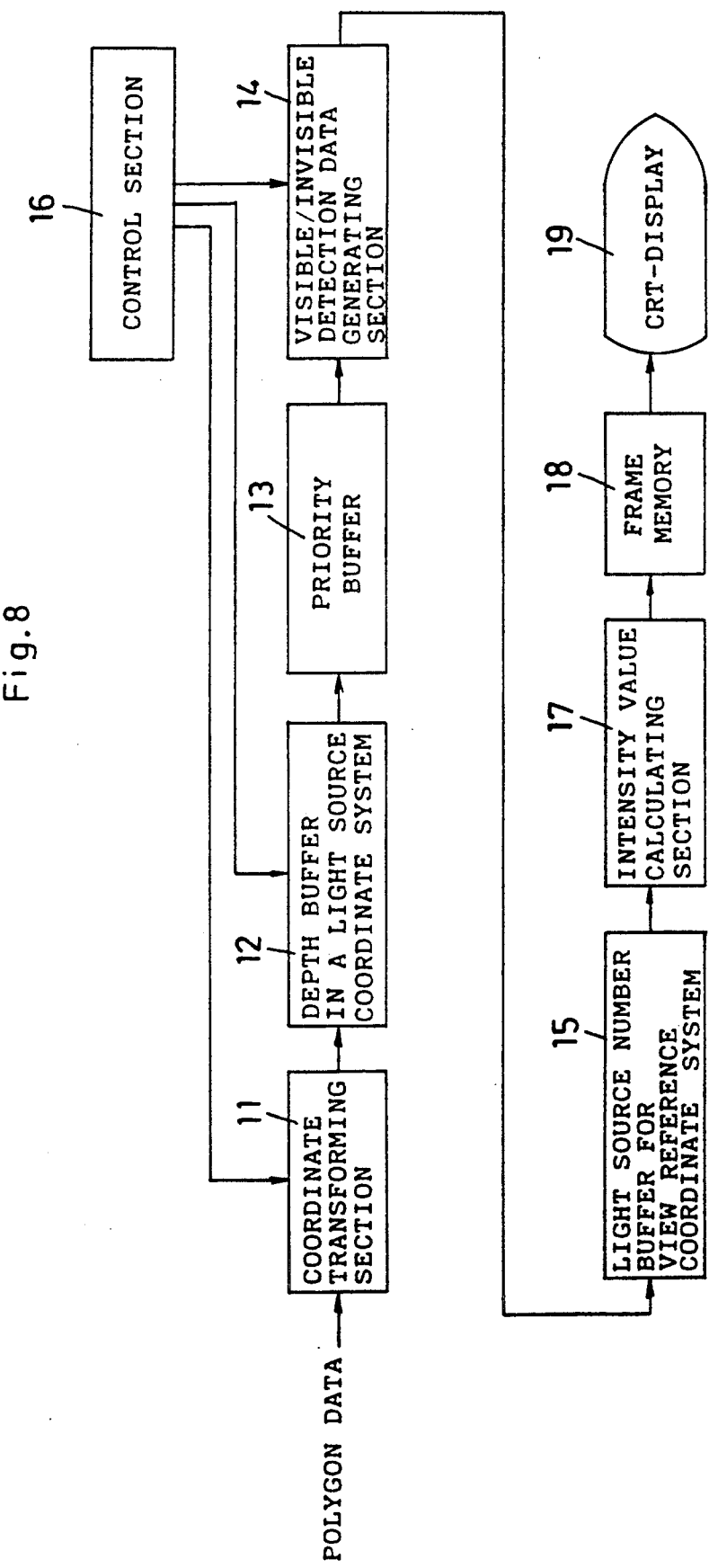

Fig.9(A) VIEW REFERENCE COORDINATE SYSTEM
Fig.9(B) LIGHT SOURCE COORDINATE SYSTEM
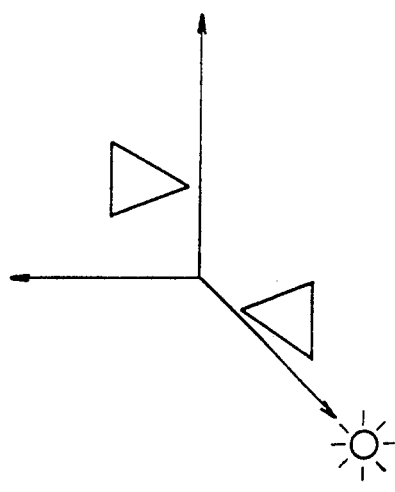

13 PRIORITY BUFFER
"1" "2"... PRIORITY NUMBER

15 LIGHT SOURCE NUMBER BUFFER
"1"... VISIBLE
"0"... INVISIBLE

SHADOW REGION

SHADOW

SHADOW

SHADOW

METHOD AND APPARATUS FOR APPLYING A SHADOWING OPERATION TO FIGURES TO BE DRAWN FOR DISPLAYING ON CRT-DISPLAY

BACKGROUND OF THE INVENTION

The present invention relates to shadowing methods and apparatus, and more particularly to methods and apparatus for shadowing using a depth buffer algorithm to provide a three dimensional expression of a picture as a whole.

In the field of computer graphics, development in expression is demanded. Concretely it is strongly demanded that not only three dimensional expression of an unit figure but also three dimensional expression of all figures as a whole is carried out. To satisfy the demand, research has been directed to carrying out a shadowing function for performing the three dimensional expression of all figures as a whole in a computer graphics system.

Following are proposals for shadowing:

(1) A first method (refer to FIG. 12) includes the steps of.
  imaging viewing direction line segments for uniting a viewpoint and points on a projection plane which points correspond to each pixel,
  obtaining crossing points of each viewing direction line segment and the frontmost figure intersecting the viewing direction line segment,
  obtaining light beam direction line segments for uniting a light source and each crossing point,
  determining the existence of figures which intersect the light beam direction line segments,
  drawing the crossing points as shadowed only when at least one figure exists which intersects the light beam direction line segment.

(2) A second method (refer to FIG. 13) includes the steps of,
  projecting edges of any polygon onto another polygon,
  projecting the projected edges onto a projection plane,
  obtaining a shadowed region of a scan line based on the result on the projection plane.

(3) A third method includes the steps of,
  obtaining shadowed regions by applying an algorithm the same as the hidden surface removal to each figure supposing the depth direction as seen from the light source (refer to FIG. 14(A)),
  applying hidden surface removal to each figure supposing the depth direction as seen from the viewpoint, and mapping the shadow regions onto a projection plane (refer to FIG. 14(B)).

The first method requires a simple algorithm to display figures with shadow. But the disadvantage of requiring a long period of time for the shadowing operation arises because such operations are repeatedly carried out for every pixel.

The second method has a shortened time period compared with the first method because the shadowing operation is carried out for every scan line instead of every pixel. There is still the disadvantage that the time period is still not sufficiently shortened.

In both methods, when the figure is a freely curved surface, described by a pair cubical parametric equations, remarkably long time periods for calculation are required. As a result a remarkably long time period is required for shadowing.

The third method shortens the time period compared with the first and the second methods because the shadow regions are obtained by the algorithm used for hidden surface removal. This method has the disadvantage mapping operations are necessary which require more data and longer processing time. Also the time period is still not sufficiently short because every pixel is subjected to a shadowing operation. A further disadvantage is that figures applicable to a shadowing operation are limited because of a need for determining the relationship between figures.

Considering these disadvantages, a shadowing method is disclosed which applies a depth buffer algorithm to figures defined in both a light source coordinate system and a view reference coordinate system. Refer to "Simplified shadowing method with Z-buffer method" by Shimizu Kazuya and three others, the 30th national convention of data processing society (the first term of Showa 60-nen).

The method does not consider a limit for shadowing, useless shadowings are carried out and insufficient shadowing accuracy is obtained corresponding to a region necessary for shadowing, accordingly. Also coordinate transformations, comparison between coordinate values and others necessary for shadowing are carried out for each pixel, quantity of calculation is increased remarkably and useless calculation is carried out, accordingly. As a result, disadvantages in insufficiently reduced time periods for shadowing arise.

More particularly, the Shimizu Kazuya et al. method can be divided into two groups of operations, one group of operations involves extracting the most light source side depth values in the light source coordinate system, and the other group of operations involves calculating intensity values of every pixel based on the comparison results of depth values of every figure in the light source coordinate system when executing interpolation in the view reference coordinate system. The former group of operations is carried out with hardware like symmetric digital differential analyzers (hereinafter referred to as DDA) so as to operate at extremely high speed, the necessary time for unit operation is on the order of nsec. or tens of nsec. Sufficient shortening of time is accordingly achieved. On the contrary, the latter group of operations is carried out with software because comparing operations and calculating operations based on the comparison result are not suitably carried out with hardware. As a result, the latter group of operations is carried out at extremely low speed compared with the former group of operations, and the necessary time for unit operation is on the order of microseconds when using a popular computer graphic system. Further, the latter group of operations must be carried out for every pixel of every figure, and the disadvantage of insufficiently shortened shadowing time arises.

Furthermore, every method described in the foregoing applies to a model having only one light source, and does not apply &o plural light sources. In most real life situations, the model has plural light sources. It seems possible that the Shimizu Kazuya et al. method are applicable to a model having plural light sources, but it is practically impossible because the method requires plural depth buffers, each having large storing capacity.

SUMMARY OF THE INVENTION

It is an object of the present invention to decrease the number of pixels necessary for shadowing, and to remarkably shorten the time necessary for shadowing.

It is another object of the present invention to obtain high quality shadowing even if plural light sources exist.

It is a further object of the present invention to remarkably shorten time necessary for shadowing even if plural light sources exist.

This present invention first extracts those figures to be drawn with shadowing within a shadowing volume, from all figures. The shadowing volume is a volume including figures of which shadows may be projected in a view volume. Also the shadowing volume may be defined large or small based on the requirement for shadows to be displayed in the view volume. Thereafter, the invention transforms the extracted figures to figures having individual data defined in a light source coordinate system in which a radiation direction of a light source is a depth direction, and judges for every pixel of the transformed figures whether each pixel is before or behind other pixels in the depth direction, and obtains existence information indicative of the most light source side pixel, i.e. the pixel which is nearest the light source, for each extracted figure, based on the results of the judgement. Further the invention judges for each extracted figure whether all pixels of the extracted figure are on the most light source side, or only some pixels are on the most light source side, or none of the pixels is on the most light source side based on the existence information thus obtained. When the judgement is made that all pixels of the extracted figure are on the most light source side, the invention draws the entire region of the extracted figure based on lighten information. When the judgement is made that none of the pixels of the extracted figure is on the most light source side, the invention draws the entire region of the extracted figure based on shadow information. When the judgement is made that only some pixels of the extracted figure are on the most light source side, the invention draws the entire region of the extracted figure based on lighten information or shadow information selecting with reference to the existence information.

In this shadowing method, both operations are carried out at extremely high speed on hardware such as DDA, one of the operations obtains the existence information of the most light source side pixel in the light source coordinate system, and the other operation judges whether all pixels of the extracted figure exist on the most light source side, or only some pixels exist on the most light source side, or none of the pixels exists on the most light source side. Also, the drawing operation is carried out at extremely high speed on hardware such as DDA, which operation is drawing the entire region of the extracted figure according to only lighten information or shadow information. Further the drawing operation is carried out using software which operation effects drawing of the extracted figure according to lighten information or shadow information in correspondence with whether or not the pixel exists on the most light source side. As a result, the number of figures to be drawn by using software is decreased, and the operating speed is increased. Rather than on the order of microseconds, operation is on the order of nsec. for the number of figures which are drawn entirely based on only lighten information or shadow information.

extremely reducing the time period as a whole for drawing figures is accordingly achieved, in spite of the lengthening of time of several tens nsec. due to the judging figure operation based on the existence information.

It is preferred that figures to be drawn are initially defined in a world coordinate system, and these figures are transformed through a matrix operation to figures having individual data defined in the light source coordinate system or figures having individual data defined in the view reference coordinate system.

It is also preferred that figures to be drawn in which only some pixels exist on the most light source side, are drawn based on lighten information or shadow information corresponding to coincidence judgement results of priority number data of the most light source side figure with priority number data of a figure to be drawn, which priority number data are obtained prior to a coincidence judgement operation.

It is further preferred that figures to be drawn in which only some pixels exist on the most light source side, are drawn based on lighten information or shadow information corresponding to coincidence judgement results of depth values stored in a depth buffer for &he light source coordinate system with depth values for the light source coordinate system, of the figure to be drawn, which depth values are obtained prior to a coincidence judgement operation.

It is further preferred that figure storing memory means are further provided, and discrimination data are stored in the figure storing memory means, which discrimination data are data indicating whether all pixels of the figure exist on the most light source side, or only some pixels exist on the most light source side, or none of the pixels exists on the most light source side.

When plural light sources exist, this present invention first extracts figures subject to drawing to be shaded within a shadowing volume from all figures, then transforms the extracted figures to figures having individual data defined in a light source coordinate system as to one of plural light sources in which a radiation direction of the light source is a depth one, and judges for every pixel of the transformed figures whether each pixel is before or behind other pixels in the depth direction, and thereafter obtains existence information of the most light source side pixel in each extracted figure based on results of the judgement. Further the invention obtains judgement data indicating whether pixels of the extracted figure are on the most light source side or not in the light source coordinate system based on the existence information, then gives lighten intensity information or shadow intensity information to corresponding pixels of each figure having individual data defined in a view reference coordinate system in which a direction of view is a depth one, and stores the lighten intensity information or shadow intensity information in a memory assigned to the light source. The invention repeatedly carries out the foregoing operations from the transforming operation to the storing operation for every light source. Finally the invention draws every figure to be drawn by performing a shadowing operation based on the lighten intensity information or shadow intensity information stored in each memory assigned to a corresponding light source.

In this shadowing method, drawing figures with shadow for the model which has plural light sources, is performed through repeatedly carrying out operations to obtain and store lighten intensity information or shadow intensity information for every light source, and calculating intensity for drawing based on the obtained intensity information for every light source.

It is preferred that the judgement data are obtained based on comparison results of depth values or priority number data.

It is also preferred that the shadow intensity information and the lighten intensity information are flag data whether "0" or "1" indicating that pixels are shaded or not.

When plural light sources exist also, this present invention first extracts figures subject &o drawing to be shaded within a shadowing volume from all figures, then transforms the extracted figures to figures having individual data defined in a light source coordinate system as to one of plural light sources in which a radiation direction of the light source is a depth one, and judges for every pixel of the transformed figures whether each pixel is before or behind other pixels in the depth direction, and thereafter obtains existence information of the most light source side pixels in each extracted figure based on results of the judgement. Further the invention judges whether each pixel of each figure is on the most light source side or not in the light source coordinate system based on the existence information, then gives a lighten information or shadow information as a basic information for drawing to a corresponding pixel of each figure having individual data defined in a view reference coordinate system in which a direction of view is a depth one, and further transforms the lighten information and shadow information of every pixel to intensity values, then stores the intensity values in a intensity memory. The invention repeatedly carries out the foregoing operations including transforming figures to figures having individual data defined in the light source coordinate system through storing intensity values in the intensity memory, for every light source, and cumulatively adding the intensity values when they are stored in the intensity memory. Finally the invention displays every figure subject to drawing based on the added intensity values on a cubic ray tube display (hereinafter referred to as CRT-display).

In this shadowing method, displaying figures with shadows for a model having plural light sources is performed through calculating the intensity values and storing the intensity values in the intensity memory, thereby eliminating extra calculation to obtain the intensity values for display.

It is preferred that the intensity memory is an image memory to be drawn for display on the CRT-display.

BRIEF DESCRIPTION OF THE DRAWINGS

FIG. 4(A) is a diagram useful in understanding a coordinate transformation to a view reference coordinate system;

FIG. 4(B) is a diagram useful in understanding a coordinate transformation to a light source coordinate system;

FIG. 8 is a block diagram showing a fifth embodiment of a shadowing apparatus according to the present invention;

FIG. 9(A) is a perspective view showing sample figures defined on the view reference coordinate system;

FIG. 9(B) is a perspective view showing the sample figures corresponding to the sample figures shown in FIG. 9(A) transformed to the light source coordinate system;

DETAILED DESCRIPTION OF THE PREFERRED EMBODIMENTS

Figure 1:
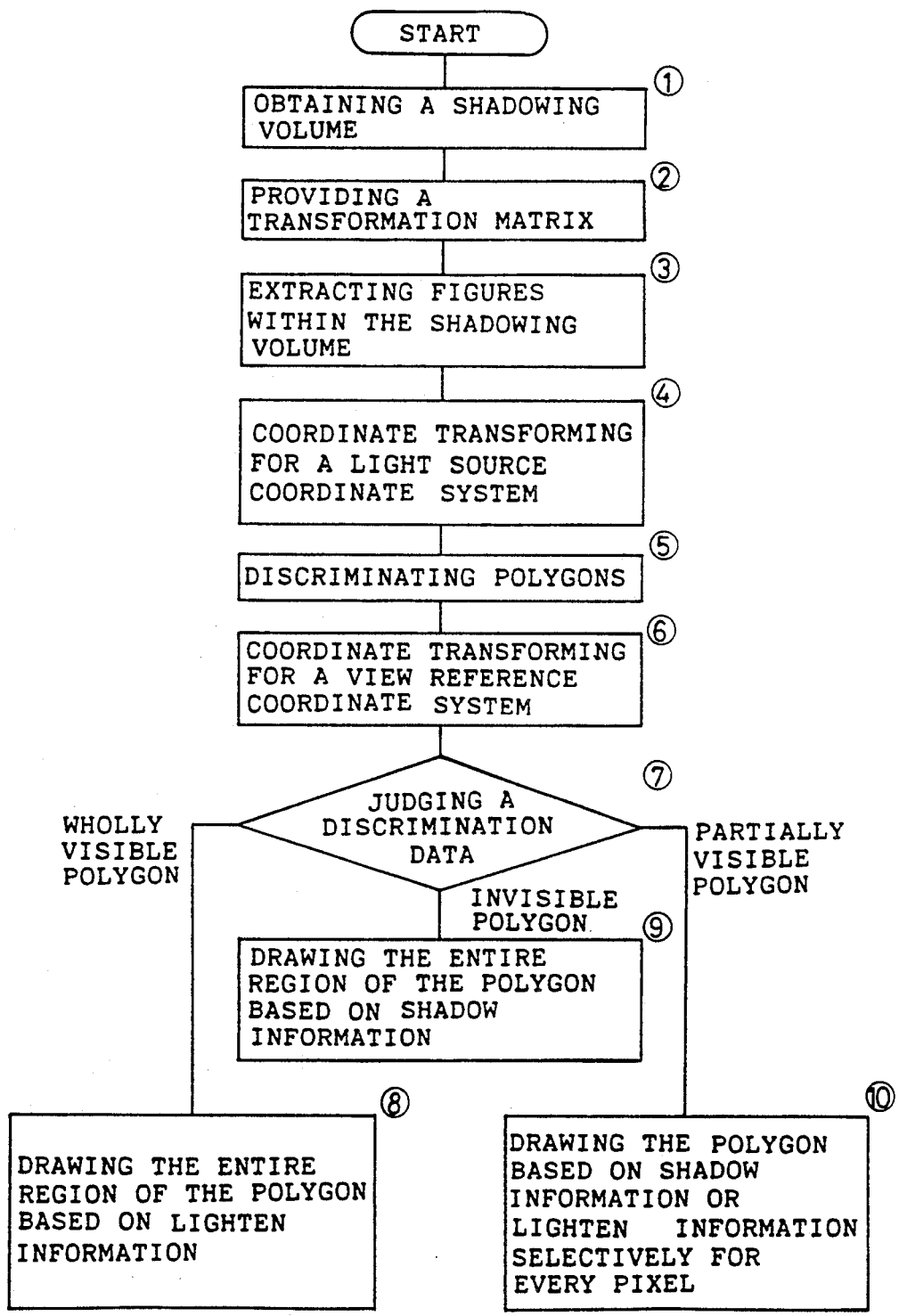
FIG. 1 is a flowchart for a shadowing method according to a first embodiment of the present invention.

FIG. 1 is a flowchart for use in explaining a first embodiment of a shadowing method according to the present invention.

In step(1), a shadowing volume is obtained in which figures subject to shadowing are included, from figures defined in a world coordinate system. The shadowing volume is a volume including desired figures of which shadows may be projected in a view volume. Also, the shadowing volume may be defined large or small based on the requirements for shadows to be displayed in the view volume. In step (2), a transformation matrix to a light source coordinate system is provided which matrix is determined to fall a transformed coordinate value in the range of a depth buffer for the light source coordinate system. In step (3), only figures existing within the shadowing volume are extracted from all figures to be drawn by a clipping operation or the like, based on the shadowing volume. In step (4), coordinate data of every pixel of the extracted figures in the light source coordinate system are obtained by carrying out a coordinate transformation to the light source coordinate system, to coordinate data of every pixel of polygons constituting the figures subject to drawing. The light source coordinate system is a coordinate system having a depth direction which is a direction of radiation of a light source. The light source is, most preferably, a parallel light source, but the light source may be a spot light source or the like. When a spot light source is employed, it is possible to obtain a parallel radiation direction by carrying out a coordinate transforming operation including perspective projection. In step (5), a judgement is made to generate discrimination data indicating whether the polygon is a polygon lightened in its whole region (hereinafter referred to as wholly visible polygon), or a polygon lightened in a partial region (hereinafter referred to as partially visible polygon), or a polygon not lightened at al (hereinafter referred to as invisible polygon). The discrimination data are supplied to a segment memory. Also, depth values of all pixels are written into a depth buffer for the light source coordinate system. The judgement is performed through following operations, the first operation is to judge the relationship before and behind for every pixel in the depth direction among plural extracted figures, the second operation is to obtain existence information giving the most light source side pixels, i.e. the pixels nearest the light source, of each extracted figure based on the results of the judgement, and the third operation is to judge for each polygon, whether all pixels of the polygon are the most light source side ones, or only some pixels are the most light source side ones, or none of the pixels is the most light source side one. More particularly, the third operation is carried out by first obtaining depth values corresponding to the frontmost pixels among all pixels of the extracted figures by using a depth buffer algorithm, and then obtaining the depth values of all pixels of each extracted figure and judging the coincidence of depth values thus obtained with the depth values corresponding to the frontmost pixels to determine whether depth values of all pixels coincide, or depth values of only some pixels coincide, or depth values of no pixels coincide. The polygons are obtained at any suitable stage through crushing the figure into plural triangles, or quadrilaterals and the like. In step (6), a coordinate transformation to a view reference coordinate system is carried out for all pixels of each polygon within a view volume. The view reference coordinate system is a coordinate system having a depth direction which is a direction of view. Also, normal vectors, light source vectors, and the transformed coordinate data are simultaneously transformed through matrix operations. In step (7), the discrimination data is identified, then in steps (8), (9), or (10), figures drawn with the shadowing operation are obtained by carrying out a drawing operation corresponding to the identification results. The operation in step (8) corresponds to a condition wherein the discrimination data indicate a wholly visible polygon and the entire region of the polygon is drawn to have shading. The operation in step (9) corresponds to the condition wherein the discrimination data indicate an invisible polygon and the entire region of the polygon, based on shadow information determined with ambient light or the like is drawn. The operation in step (10) corresponds to the condition wherein the discrimination data indicates a partially visible polygon. The operation comprises first, an interpolation of not only the coordinate data in the view reference coordinate system, but also the coordinate data transformed to the light source coordinate system, second a judgement of whether the interpolated depth values are greater than or equal to the depth values stored in the depth buffer for the light source coordinate system, and third drawing the polygon based on the shadow information or lighten information selectively for all pixels in accordance with the result of the judgement. The drawing based on the lighten information may be a drawing with shading.

According to the foregoing shadowing method, a judgement for each pixel as to whether a shadowing operation is needed or not is eliminated when wholly visible polygons and invisible polygons are drawn in a frame memory. Drawing the wholly visible polygons and invisible polygons is accordingly performed using hardware like DDA at extremely high speed. On the contrary, a judgement with using software for each pixel as to whether a shadowing operation is needed or not is still needed only when partially visible polygons are drawn in a frame memory, drawing the partially visible polygons is performed through selecting the shadow information or the lighten information for every pixel based on the judgement result, using software. As a result, the quantity of operation with the software is remarkably decreased as a whole, display with shadow is accordingly performed at extremely high speed.

SECOND EMBODIMENT

Figure 2:
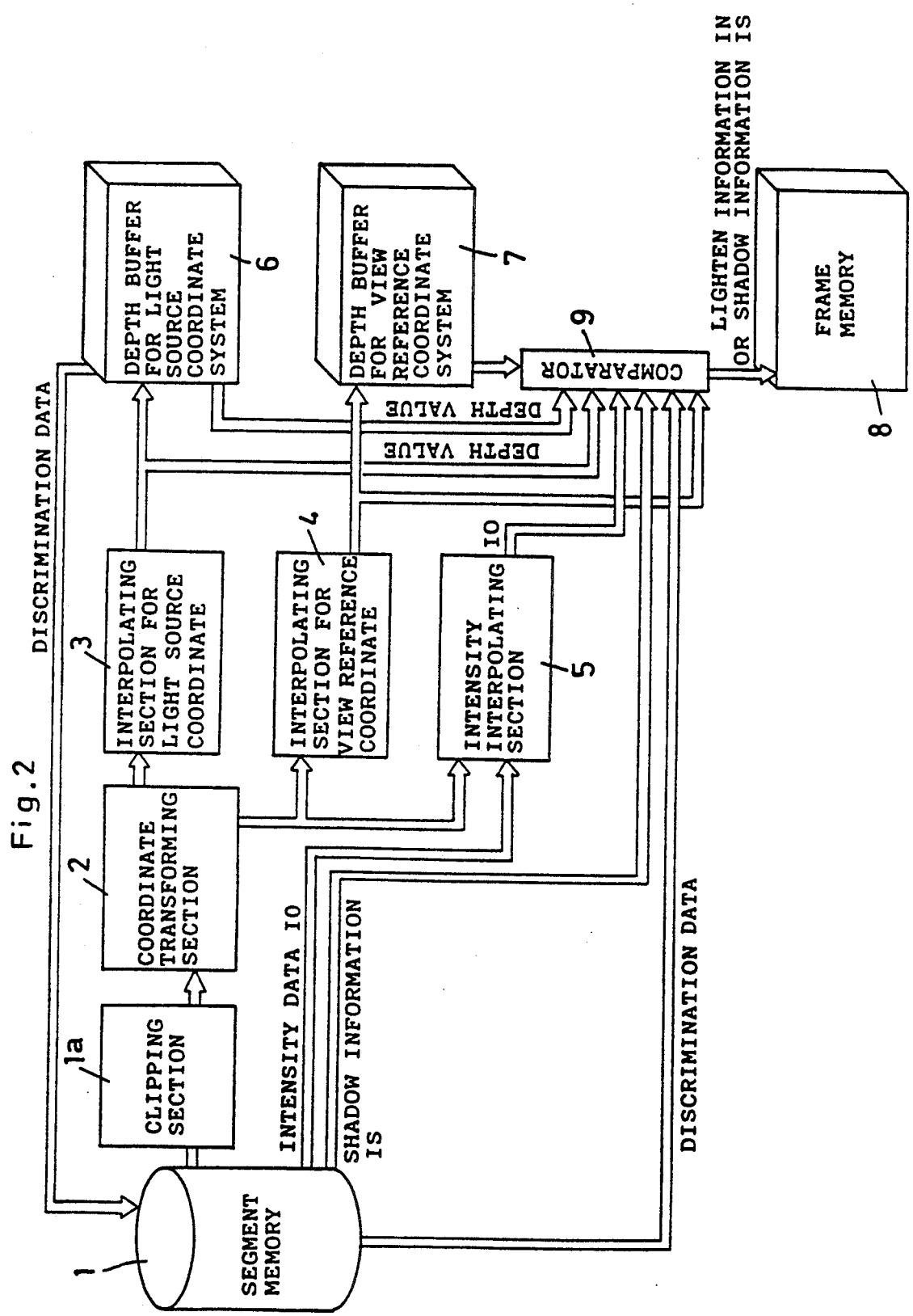
FIG. 2 is a block diagram showing a second embodiment of a shadowing apparatus according to the present invention.

FIG. 2 is a block diagram showing a shadowing apparatus according to a second embodiment of the present invention.

The shadowing apparatus includes, a segment memory 1 as a figure storing memory means for storing figures and discrimination data described later, which figures are defined in a world coordinate system and supplied from a host processor (not shown), a clipping section 1a as an extracting means for extracting figures within a shadowing volume, from the stored figures which shadowing volume is defined by an operator and the like, a coordinate transforming section 2 for selectively performing coordinate transformations to a light source coordinate system or a view reference coordinate system for all pixels of the extracted figures, an interpolating section 3 for light source coordinate, for performing interpolation operations based on input data transformed to light source coordinates, thereby to obtain coordinate data for each pixel of figures to be drawn in the light source coordinate system, an interpolating section 4 for view reference coordinate, for performing interpolation operations based on input data transformed to view reference coordinates, thereby to obtain coordinate data for each pixel of figures to be drawn in the view reference coordinate system, a intensity interpolating section 5 for performing interpolation operations based on output intensity data from the coordinate transforming section 2, thereby to obtain intensity data for each pixel of figures to be drawn, a depth buffer 6 for a light source coordinate system, for sequentially storing pixel data according to a depth buffer algorithm, which pixel data are obtained by the interpolating section 3, thereby to store depth values of the most light source side pixels, a depth buffer 7 for a view reference coordinate system, for sequentially storing pixel data according to a depth buffer algorithm, which pixel data are obtained by the interpolating section 4, thereby to store depth values of the most viewpoint side pixels, a frame memory 8 which provides an image memory means for storing intensity data for all pixels, which frame memory is controlled based on a depth flag output from the depth buffer 7, and a comparator 9 for selecting lighten information or shadow information as intensity data to be written in the frame memory 8, based on the discrimination data read out from the segment memory 1 and the depth values output from both interpolating section 3 and 4, and the depth values read out from both depth buffers 6 and 7.

The depth buffer 6 holds the depth values of the most light source side pixels out from the sequentially supplied pixel data in the light source coordinate system. The depth buffer 6 also detects whether depth values of all pixels constituting each figure are written in it, or depth values of only some pixels are written in it, or whether depth values of no pixels are written in it, and generates wholly visible data, partially visible data or invisible data corresponding to the detection result. The wholly visible data, partially visible data or invisible data is supplied to the segment memory 1 as the discrimination data.

Figure 3:
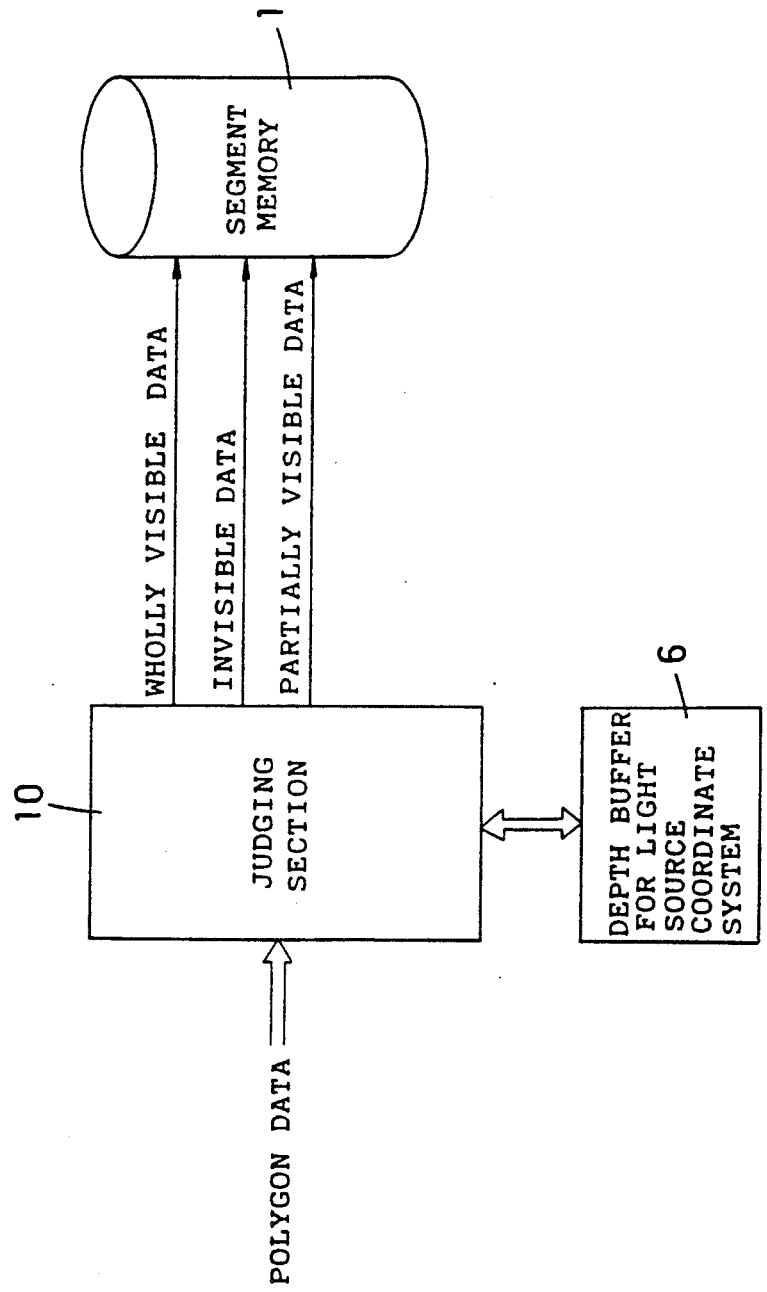
FIG. 3 is a block diagram in schematic form which shows an apparatus for generating judgement data.

FIG. 3 is a block diagram schematically showing an apparatus for generating discrimination data.

In this apparatus there is provided a judging section 10 for receiving polygon data and depth values read out from the depth buffer 6 and for generating discrimination data. The polygon data are the data describing pixels constituting each polygon, including depth values for each polygon obtained by crushing a figure into plural polygons into triangular or quadrilateral shapes. The polygon data are generated sequentially with hardware such as DDA, which polygon data are within the volume clipped by the shadowing volume. The depth values read out from the depth buffer 6 are the depth values of the most light source side pixels as a result of a depth buffer algorithm in the light source coordinate system. The judging section 10 judges the coincidence or not of the received depth values of all pixels having the corresponding depth values read out from the depth buffer 6, and generates wholly visible data indicating the all pixels of the polygon are coincident with the depth values read out, or invisible data indicating that no pixel of the polygon is coincident with the depth values read out, or partially visible data indicating the only some pixels of the polygon are coincident with the depth values read out. The generated data is supplied to the segment memory 1 as the discrimination data.

The operation of the shadowing apparatus having the arrangement described above is as follows.

Plural figures defined in the world coordinate system are sequentially supplied to and stored by the segment memory 1 from a host processor (not shown). discrimination data storing regions are assigned to each figure.

Each figure is defined in the light source coordinate system determining a light beam (illustrated with an arrow in FIG. 4(B)) as a depth direction, by performing a coordinate transformation to the light source coordinate system to pixel data of a corresponding figure read out from the segment memory 1. Each figure thus transformed is clipped by the shadowing volume, thereby necessary figures within the shadowing volume are extracted (see a region indicated with 2 dot-dash lines in FIG. 4(B)). Figures within the shadowing volume are subjected to a depth buffer operation. On the contrary, each figure is defined in the view reference coordinate system, determining an arrow A indicating a direction of view (illustrated in FIG. 4(A)) as a depth direction, through applying coordinate transformation to a view reference coordinate system to pixel data of a corresponding figure read out from the segment memory 1. Each figure thus transformed is clipped with the view volume whereby necessary figures within the view volume are extracted (see a region indicated with chain lines in FIG. 4(A)). Figures within the view volume are subjected to a depth buffer operation. The pixel data of a corresponding figure include not only apex information described by normal vectors, light source vectors and others, but also pixel data obtained by a coordinate transformation to the light source coordinate system. Further, depth values of all pixels constituting a crushed polygon are written into the depth buffer for the light source coordinate system, and the discrimination data is generated and stored in the corresponding region of the segment memory 1. After that, a necessary operation is selected with the comparator 9 for the coordinate transformed pixel data to the view reference coordinate system, which selection is made in correspondence with the discrimination data read out from the segment memory 1. The pixel data corresponding to the discrimination data is written into the frame memory 8. More particularly, when the discrimination data is wholly visible data, no shadowing operation is needed, hence the intensity data IO are selected and written into the frame memory 8 by the comparator 9 as lighten information IN, which intensity data are generated by a shading operation by the intensity interpolating section 5. When the discrimination data is invisible data, no region of the figure is lightened by a direct light beam, hence intensity data corresponding to ambient light or the like are selected and written into the frame memory 8 by the comparator 9 as shadow information IS. When the discrimination data is partially visible data, pixel data are obtained through interpolating operations in the view reference coordinate system and the light source coordinate system, and a depth value ZL obtained in the light source coordinate system is compared with the depth value ZB stored in the depth buffer 6 for the light source coordinate system. When ZL=ZB, the intensity data IO is selected as a lighten information IN and written into the frame memory 8, which intensity data IO is obtained by a shading operation. On the contrary, when ZL<ZB, shadow information IS is selected and written into the frame memory 8.

Figure 5:
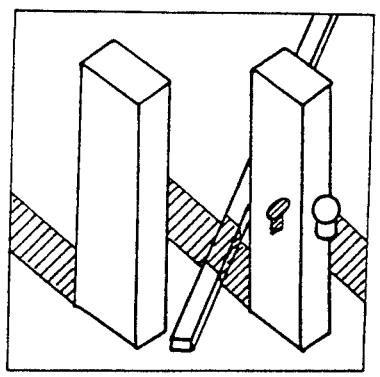
FIG. 5 is a view showing a sample picture drawn according to the shadowing operation according to the present invention.

FIG. 5 shows a three dimensional picture within a view volume, which picture is obtained through a shadowing operation as described above. As apparent from this picture, a fine three dimensional expression is obtained by additionally displaying a shadow caused by a figure not displayed itself, which figure is clipped out through the clipping operation with the view volume.

As apparent from the foregoing, it is not required to judge whether a shadowing operation must be performed for all pixels of every polygon, but all pixels of only some polygons, hence the time necessary for shadowing is extremely reduced and high-speed displaying is maintained when such a shadowing operation is carried out.

THIRD EMBODIMENT

Figure 6:
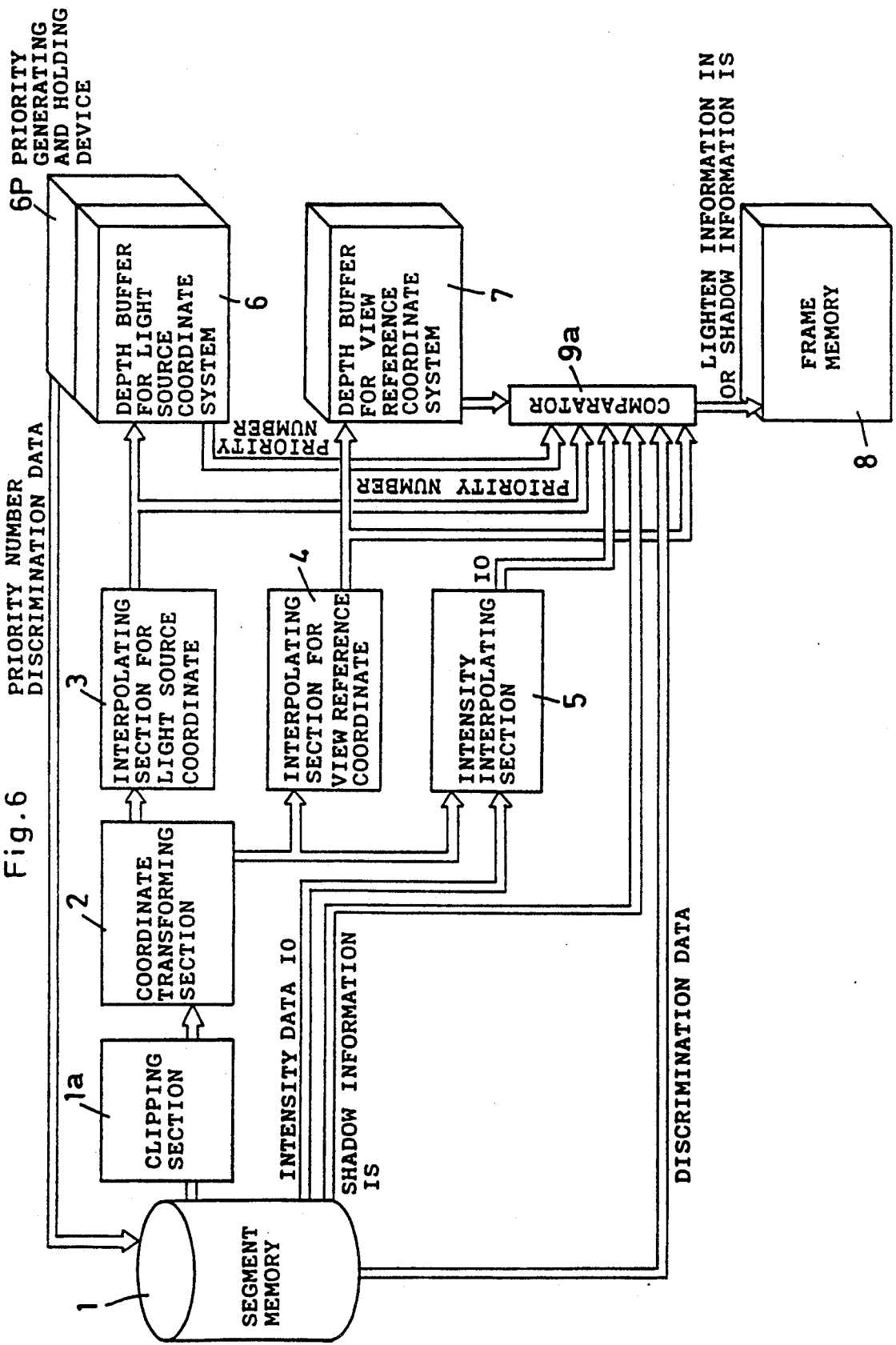
FIG. 6 is a block diagram showing a third embodiment of a shadowing apparatus according to the present invention.

FIG. 6 is a block diagram of a third embodiment of a shadowing apparatus according to the present invention.

Different points from the second embodiment are as follows, (1) a priority generating and holding device 6P for generating and holding priority numbers of all polygons in a depth direction is included at the depth buffer 6 for the light source coordinate system, which priority numbers are stored in the segment memory 1, (2) the comparator 9 is replaced by a comparator 9a controlled by priority numbers read out from the segment memory I and the priority generating and holding device 6P.

The operation of the shadowing apparatus having the arrangement described above is as follows.

For each polygon it is judged whether all pixels of the polygon are the most light source side ones or not by comparing the depth value already stored in the depth buffer 6 and the supplied depth value. Concretely, firstly depth values of all pixels constituting every polygon are generated and written into the depth buffer 6 using the depth buffer algorithm. Secondly, depth values of all pixels constituting every polygon are generated again, and the depth values thus generated are compared with the depth values stored in the depth buffer 6, thereby to identify a polygon as the most light source side one when depth values of all pixels are coincident with the depth values stored in the depth buffer 6. Thirdly, a priority number is generated only when a polygon is judged to be the most light source one. After that, the same operations are carried out for every polygon not given a priority number yet, thereby to generate a priority number. Priority numbers for all polygons are generated in the same manner.

In this embodiment, it is not necessary to compare the depth values of all pixels when a polygon given a partially visible data (hereinafter referred to as partially visible polygon) is to be drawn, but necessary to compare a priority number of a drawing polygon with a priority number read out from the priority generating and holding device 6P for judging the drawing with intensity data 10 or shadow information IS, thereby to simplify the shadowing operation.

As apparent from the foregoing with respect to the second and third embodiments, the drawing speed including shadowing, is increased extremely because the number of necessary operations are extremely decreased, and a model having multiple freely curved planes is easily drawn with shadowing. Also a number of polygons subjected to shadowing is decreased because defining the shadowing volume is allowed, thereby to extremely increase the drawing speed with shadowing. Further the shadowing volume may be defined only including desired polygons, thereby to raise resonance for the shadows and to obtain a high quality display with shadows.

In the second and third embodiments, the coordinate transforming section preferably may be divided into two parts, one is a light source coordinate system and the other is a view reference coordinate system, and a selector or the like may be employed instead of the comparator.

FOURTH EMBODIMENT

Figure 7:
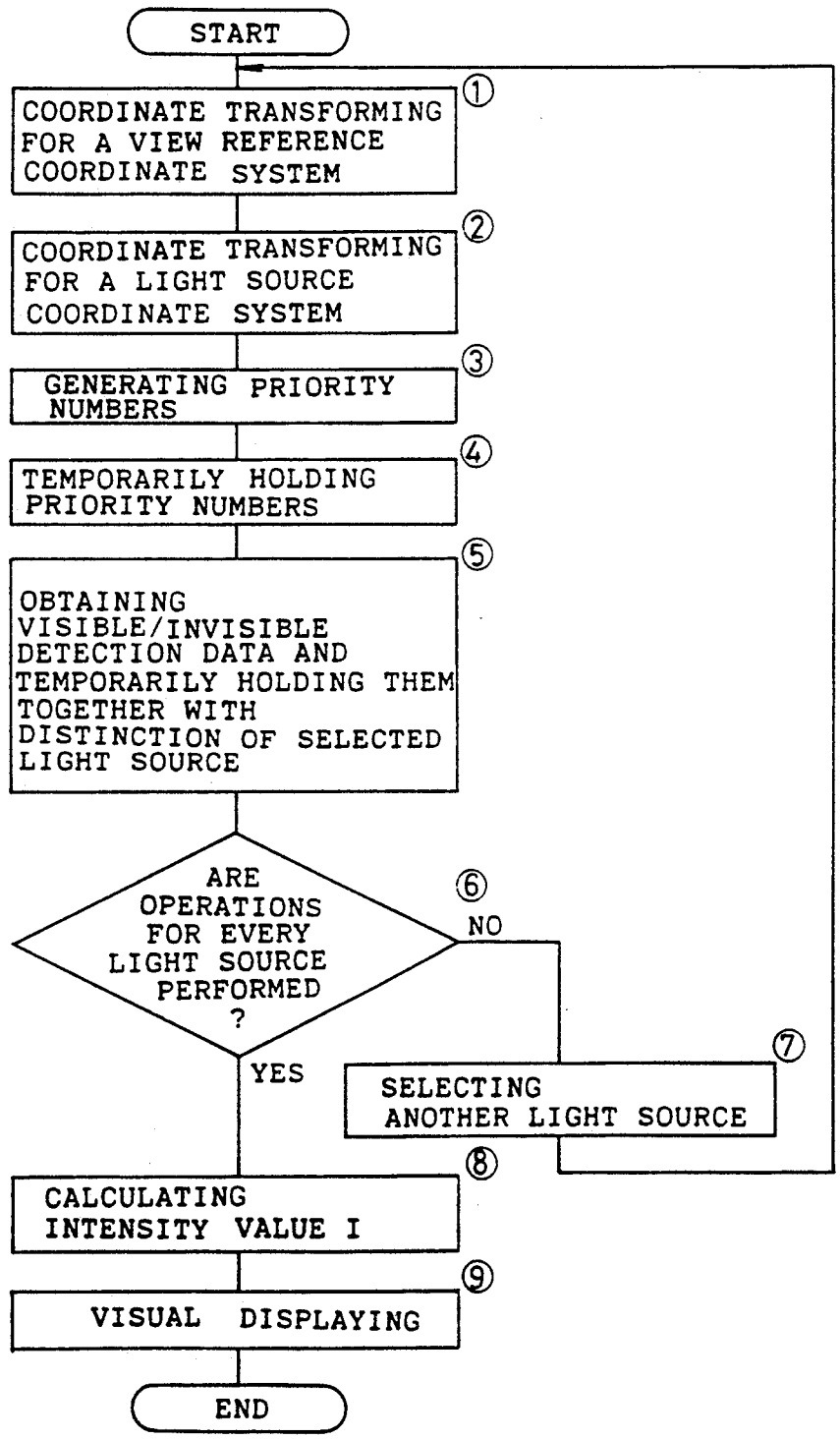
FIG. 7 is a flowchart for a shadowing method according to a fourth embodiment of the present invention.

FIG. 7 is a flowchart of a shadowing method according to a fourth embodiment of the present invention. This flowchart corresponds to an embodiment having plural light sources.

In step(1), figures to be drawn which are defined in the world coordinate system are transformed to coordinate data in a view reference coordinate system. In step(2), figures to be drawn which are defined in the world coordinate system are also transformed to coordinate data in a light source coordinate system of a selected light source. In step (3), priority numbers of all pixels of all figures are generated through sorting in a depth direction (hereinafter referred to as Z-sorting) in the light source coordinate system. In step (4), priority numbers thus generated are temporarily held. In step (5), priority numbers are transformed to visible/invisible detection data, and the detection data are temporarily held together with the distinction of the selected light source. The visible/invisible detection data is data indicating whether or not the pixel is the most light source side pixel. In step (6), a judgement is made as to whether or not operations for every light source are performed. If operations for some light sources are not performed, in step (7), another light source is selected for operations, then the operation of step (1) is carried out again. On the contrary, when the decision is made in step (6) that operations for all light sources are performed, in step (8), an intensity value I of each pixel of each figure is calculated by executing the equation $I = (ambient\ light + diffuse\ light + reflection\ light)$ (reflection light = 0 corresponding to a shadow portion) based on the visible/invisible detection data temporarily held for all light sources. In step (9), visual display is performed based on the intensity value I thus calculated, thereby to obtain a picture shaded with plural light sources.

Summarizing the above, the shadowing operation only requires a detection operation for visible/invisible detection data by Z-sorting for each light source, and a calculation operation for obtaining intensity values based on the detection results, hence the number of operations is decreased remarkably, resulting in high-speed shadowing operations. Concretely, the time required for only drawing figures with shadows was nearly the same as required for drawing figures without shadows, and operations prior to the drawing operation are not so complicated, hence the operating speed for shadowing is increased extremely as a whole. Furthermore, the storing capacity required for storing priority numbers is extremely smaller than that required when using plural depth buffers, the number of which buffers equals the number of light sources, because each priority number is provided by on to few bits and each depth value is provided by ten and several to twenty and several bits.

FIFTH EMBODIMENT

FIG. 8 is a block diagram of a fifth embodiment of a shadowing apparatus in accordance with the present invention.

The shadowing apparatus includes,
- a coordinate transforming section 11 for transforming coordinate data of all pixels of a figure to be drawn and defined in a world coordinate system to both coordinate data in a light source coordinate system and coordinate data in a view reference coordinate system,
- a depth buffer 12 for the light source coordinate system for Z-sorting coordinate transformed figures in the light source coordinate system and generating priority numbers based on results of Z-sorting, a priority buffer 13 for the light source coordinate system for storing generated priority numbers, a visible/invisible detection data generating section 14 for transforming the priority numbers read out from the priority buffer 13 to visible/invisible detection data, and for generating light source identification data indicating a selected light source, a light source number buffer 15 for the view reference coordinate system for storing the transformed visible/invisible detection data and the light source identification data both separately for every light source, a control section 16 for repeatedly executing coordinate transformations, Z-sorting and data transformations, the number of repetitions is equal to the number of the light sources, an intensity calculation section 17 for obtaining an intensity value I, executing the equation $I = (ambient\ light + diffuse\ light + reflection\ light)$ reflection light=0 corresponding to a shadow portion) based on the visible/invisible detection data and light source identification data read out from the light source number buffer 15, under the condition that all necessary data are written in the light source number buffer 15, a frame memory 18 for storing the obtained intensity values I. and a CRT-display 19 for providing a visual display based on the intensity values stored in the frame memory 18.

The intensity calculation section 17 also functions to extract a shadow region. It is preferrable that the shadow region extracting function and the intensity value calculating function are independent of each other.

Figure 9C:
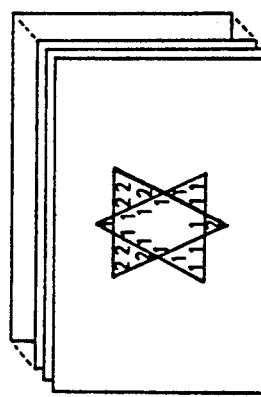
FIG. 9(C) is a perspective view illustrating a priority buffer in which priority numbers are stored.
Figure 9D:
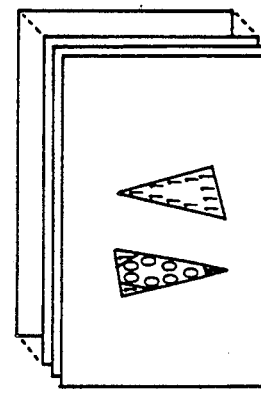
FIG. 9(D) is a perspective view illustrating a light source number buffer in which visible/invisible detection data are stored.

Considering a model having two figures defined in the view reference coordinate system as shown in FIG. 9(A) by a coordinate transforming operation, and having two figures defined in the light source coordinate system as shown in FIG. 9(B) by a coordinate transforming operation, which figures are figures defined in the light source coordinate system and correspond to the figures shown in FIG. 9(A), priority numbers as shown in FIG. 9(C) are stored in the priority buffer 13, and visible/invisible detection data are stored in a plane corresponding to a light source number of the light source number buffer 15, which visible/invisible detection data are determined based on the priority numbers. Visible/invisible detection data are shown in FIG. 9(D), and in FIG. 9(D), "1" indicates the visible detection data and "0" indicates the invisible detection data. As a result, when an intensity value is calculated, light sources are easily identified based on the visible/invisible detection data of the light source number buffer 15, which light sources are determined to be 0 with its reflection light, thereby to calculate intensity values based on the identification and obtain high quality shadowing.

SIXTH EMBODIMENT

Figure 10:
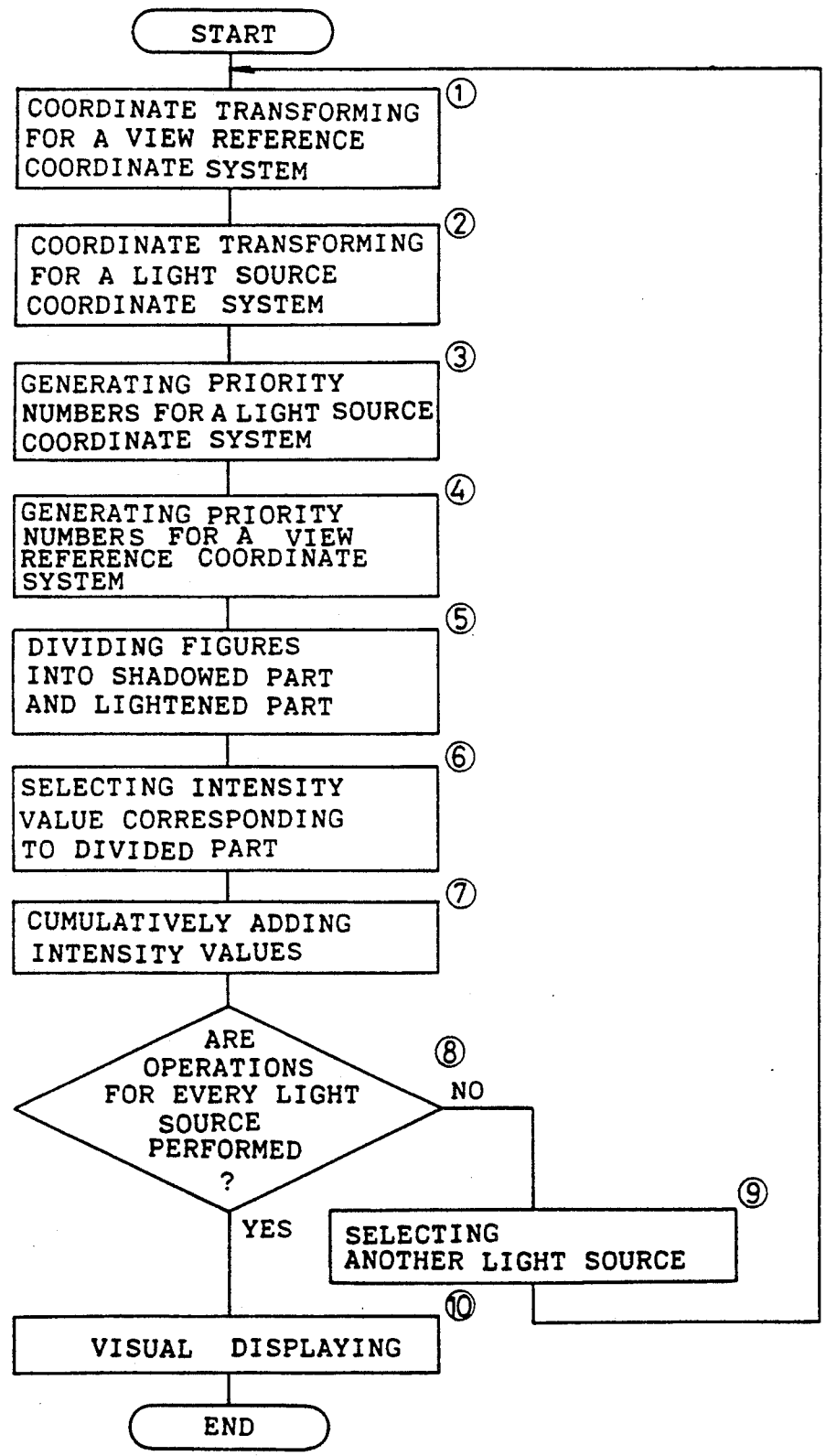
FIG. 10 is a flowchart for a shadowing method according to a sixth embodiment of the present invention.

FIG. 10 is a flowchart of a shadowing method according to a sixth embodiment of the present invention.

In step(1), figures to be drawn and defined in the world coordinate system are transformed to coordinate data in a view reference coordinate system. In step(2), figures to be drawn and defined in the view reference coordinate system are transformed to coordinate data in a light source coordinate system of a selected light source. In step (3), priority numbers of all pixels of all figures are generated through Z-sorting in the light source coordinate system. In step (4), priority numbers of all pixels of all figures are generated through Z-sorting in the view reference coordinate system. In step (5), each figure is divided into two parts, one part corresponding to shadow and the other corresponding to lightening, for a corresponding light source by comparing both priority numbers of every pixel. In step (6), intensity values are selected for every pixel based on the divided parts. In step (7), selected intensity values for every pixel are cumulatively added to the intensity values already stored in a frame memory. In step (8), a judgement is made whether operations for every light source are performed or not. If operations for some light sources are not performed, in step (9), another light source is selected for operations, then the operation of step (1) is carried out again. On the contrary, when the decision is made in step (6) that operations for every light source has been performed, in step (10), visual displaying is carried out with intensity values cumulatively added for every light source, thereby to obtain a picture with shadows which corresponds to each light source.

In this embodiment, division of each polygon into a shadowed part and a lightened part is carried out through comparing the result of Z-sorting in each light source coordinate system with the result of Z-sorting in the view reference coordinate system, and calculating and outputting intensity values is carried out based on the division result, then intensity values for display are easily obtained through cumulatively adding every calculated intensity value.

SEVENTH EMBODIMENT

Figure 11:
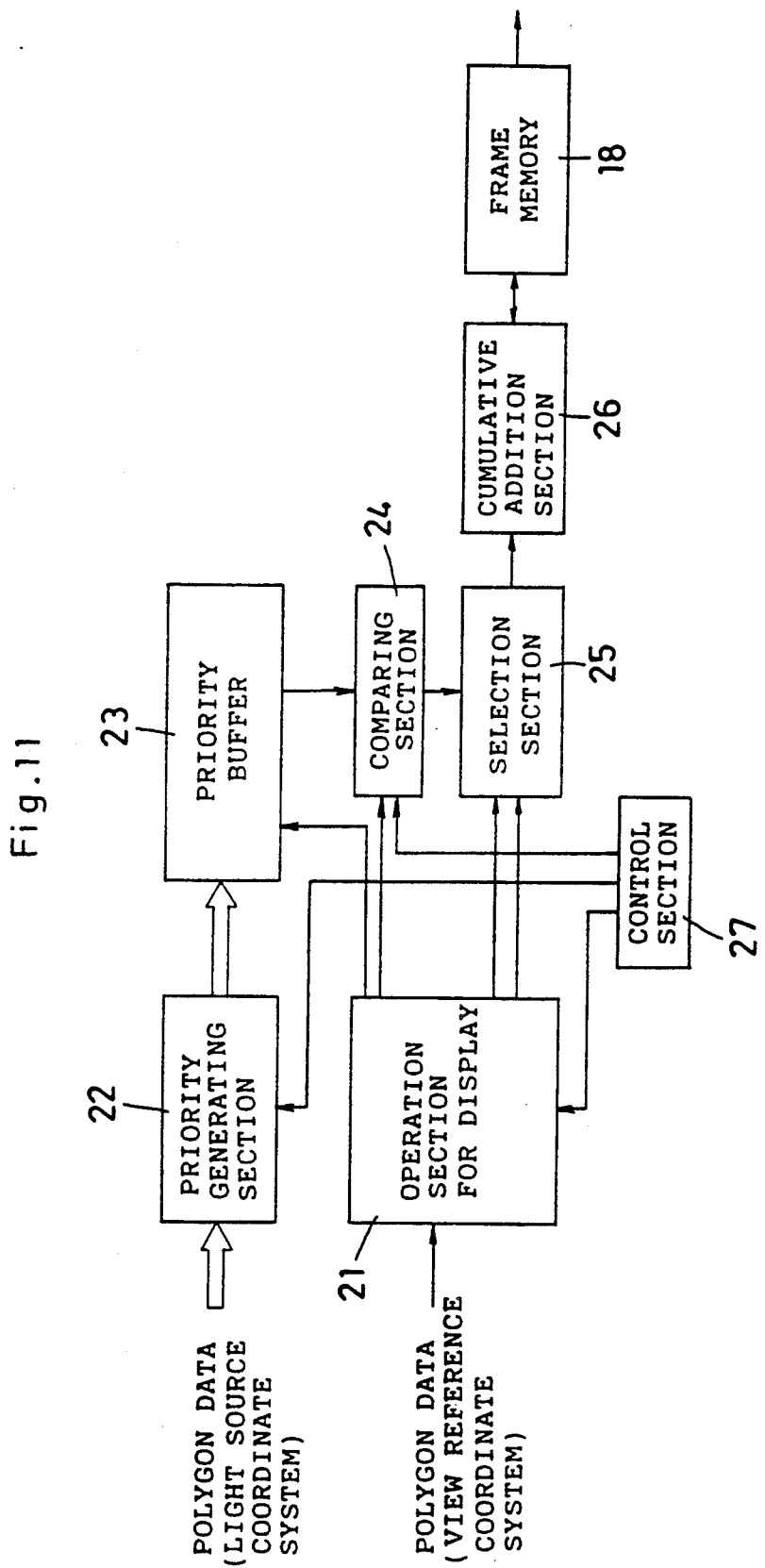
FIG. 11 is a block diagram showing a seventh embodiment of a shadowing apparatus according to the present invention.
Figure 12:
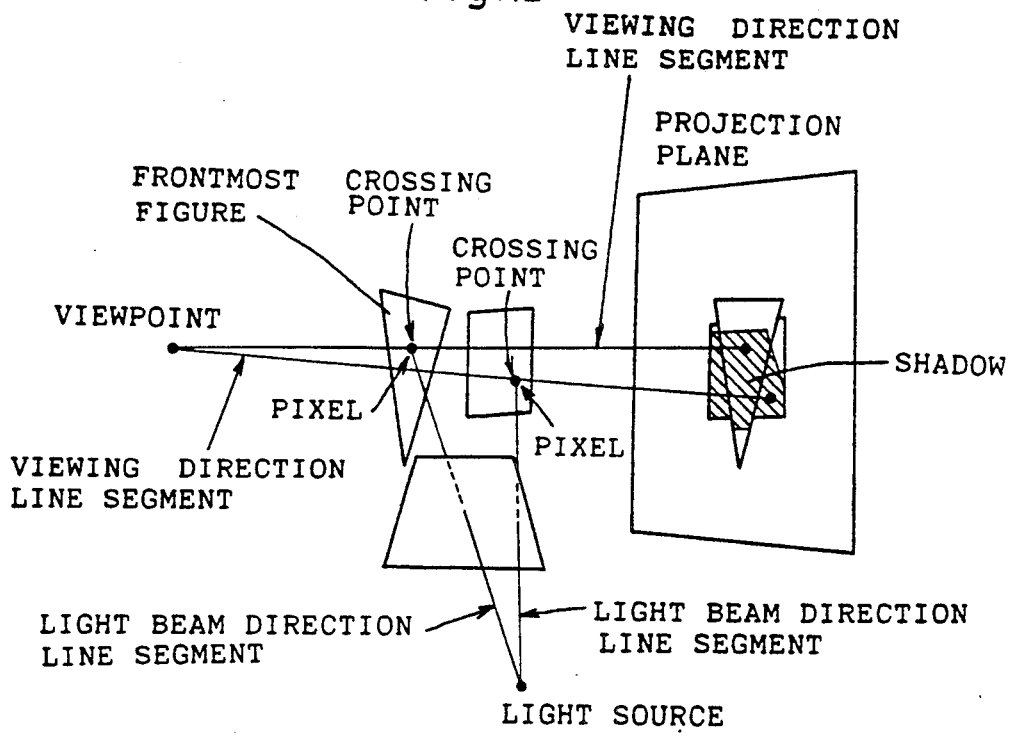
FIG. 12 is a perspective view illustrating a conventional shading method.
Figure 13:
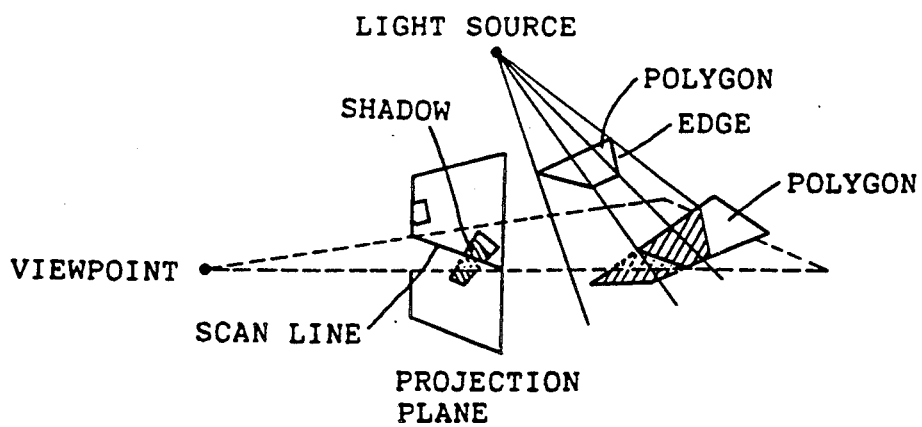
FIG. 13 is a perspective view illustrating another conventional shading method.
Figure 14A:
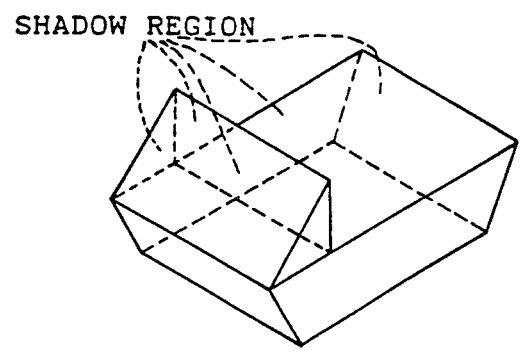
FIG. 14(A) is a perspective view illustrating hidden surface removal in the light source coordinate system used in the other conventional shadowing method.
Figure 14B:
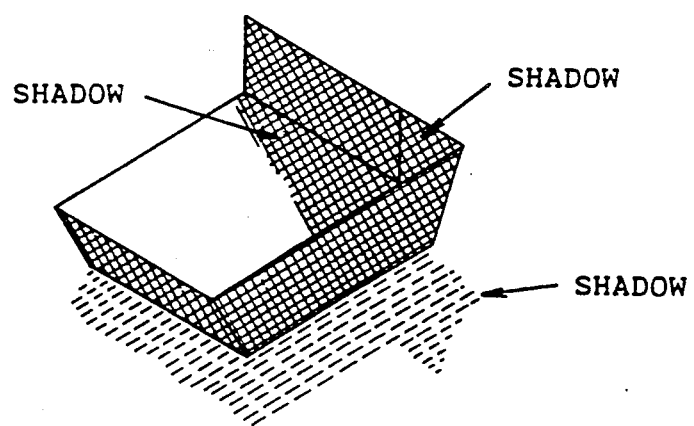
FIG. 14(B) is a perspective view illustrating hidden surface removal in the view reference coordinate system and mapping shadow region used in the conventional shadowing method.

FIG. 11 is a block diagram of a shadowing apparatus according to a seventh embodiment of the present invention.

The shadowing apparatus includes, an operation section 21 for display, for outputting coordinate values, priority numbers, intensity values for shadow, and intensity values for lightening by operations necessary for displaying figures based on supplied polygon data to be drawn and defined in the view reference coordinate system, a priority generating section 22 in a light source coordinate system for generating priority numbers based on the coordinate transformed polygon data defined in the light source coordinate system, a priority buffer 23 for storing the priority numbers in the state that the priority numbers thus generated are transformed, as defined in the view reference coordinate system, a comparing section 24 for obtaining a part identification signal by comparing a priority number outputted from the operation section 21 with a priority number read out from the priority buffer 23 based on the corresponding coordinate value, which part identification signal is a signal indicating a region of a polygon as a shadowed region or lightened region, a selection section 25 for selecting corresponding intensity values based on the part identification signal.

a cumulative addition section 26 for cumulatively adding the selected intensity values to intensity values already stored in a frame memory 18, and a control section 27 for repeatedly carrying out an operation for display, generating priority number, comparing priority numbers, by the time equal to the number of light sources.

In this embodiment, it is sufficient for operation of each light source, that either of the two intensity values is selected, which intensity values are the intensity value with reflection light component of 0 and the intensity value with reflection light component of not 0, hence it is not required to calculate intensity value as described in the fifth embodiment. Also, the construction of the apparatus is simplified because it is not necessary to store and hold plural visible/invisible detection data for each pixel, the number of which detection data equals the number of light sources, and hence the cumulative addition section 26 having lesser quantity of hardware is employed instead of the light source number buffer 15 having a large volume.

In the seventh embodiment, a decoder may preferably be employed instead of the comparing section 24, and it is preferable that the intensity value I is obtained by carrying out the equation $I = (ambient\ light) + (diffusion\ light + reflection\ light)$ in which equation the ambient light is previously given as a constant.

What is claimed is:

1. A method for applying a shadowing operation to figures to be drawn for display on a CRT-display, comprising the steps of:
   (a) extracting figures within a volume to be shadowed from every figure to be drawn to obtain extracted figures, said volume to be shadowed being a volume including desired figures for which shadows may be projected in a view volume,
   (b) transforming said extracted figures to figures having individual data defined in a light source coordinate system in which a direction of radiation from a light source defines a depth direction,
   (c) judging for every pixel of said transformed figures whether each pixel is before or behind other pixels in said depth direction, and obtaining existence information relating to which pixels are nearest said light source in each figure based on said judgement results,
   (d) judging for each figure whether all pixels of said figure are nearest said light source, or only some pixels are nearest said light source, or no pixel is nearest said light source, based on said existence information obtained in step (c), and
   (e) drawing said figures having individual data defined in a view reference coordinate system in which a direction of view is a depth direction,
   wherein according to said result of judgement in step (d), (i) figures having some pixels which exist nearest said light source, are drawn for every pixel based on shadow information or lighten information selected with reference to said existence information obtained in step (c), (ii) figures having no pixel which exists nearest said light source are drawn entirely based on shadow information, and (iii) figures having all pixels existing nearest said light source are drawn entirely based on lighten information.

2. A method as set forth in claim 1, wherein said figures are defined in a world coordinate system at the first stage, and these figures are transformed to figures having individual data defined in said light source coordinate system or said view reference coordinate system through a matrix operation.

3. A method as set forth in claim 1, wherein said figures having only some pixels nearest said light source are drawn based on said lighten information or shadow information corresponding to a result of judging whether stored priority number data relating to said some pixels coincides with priority number data of pixels of a figure to be drawn.

4. A method as set forth in claim 1, wherein said figures having only some pixels nearest said light source are drawn based on said lighten information or said shadow information corresponding to a result of judging whether a depth value of a pixel of a figure to be drawn in said light source coordinate system coincides with a depth value of a pixel nearest said light source, which value is stored in a depth buffer.

5. A method for applying a shadowing operation to figures to be drawn for display on a CRT-display, comprising the steps of:
   (a) extracting figures within a volume to be shadowed from every figure to be drawn to obtain extracted figures, the volume to be shadowed being a volume including desired figures for which shadows may be projected in a view volume,
   (b) transforming said extracted figures to figures having individual data defined in a light source coordinate system as to one of plural light sources in which a direction of radiation from one of said light sources is a depth direction,
   (c) judging for every pixel of said transformed figures whether each pixel is before or behind other pixels in said depth direction, and obtaining existence information relating to which pixels are nearest said light sources in each figure based on said results of the judgement,
   (d) judging whether each pixel of each figure is nearest one light source or not in said light source coordinate system, based on said existence information obtained in step (c), and giving lighten intensity information or shadow intensity information as basic information for drawing to a corresponding pixel of each figure having individual data defined in a view reference coordinate system in which a direction of view is the depth direction,
   (e) storing said lighten intensity information or shadow intensity information for each pixel obtained in step (d) in a memory assigned to said light source,
   (f) sequentially and repeatedly executing the steps from (b) to (e) for every light source, and drawing every figure to be drawn by a shadowing operation based on said lighten intensity information and shadow intensity information stored in memories assigned to said plural light sources respectively.

6. A method as set forth in claim 5, wherein the step of judging whether each pixel is nearest one of the plural light sources or not in said light source coordinate system is carried out based on a result of judging whether a depth value of a pixel of a figure to be drawn in said light source coordinate system coincides with a depth value of the pixel, nearest one of the light sources, which value is stored in a depth buffer.

7. A method as set forth in claim 5, wherein the step of judging whether each pixel is nearest a light source or not in said light source coordinate system is carried out based on a result of judging whether stored priority number data of the pixel nearest one of the light sources coincides with priority number data of a pixel of a figure to be drawn.

8. A method as set forth in claim 5, wherein said shadow information and lighten information are flag data and wherein a "0" or "1" indicates shadow or no shadow, and said flag data obtained or each light source is stored in a corresponding plane memory having a size the same as a display screen.

9. A method for applying a shadowing operation to figures to be drawn for display on a CRT-display, comprising the steps of:
(a) extracting figures within a volume to be shadowed from every figure to be drawn to obtain extracted figures, the volume to be shadowed being a volume including desired figures for which shadows may be projected in a view volume,
(b) transforming said extracted figures to figures having individual data defined in a light source coordinate system as to one of plural light sources in which a direction of radiation from one of said light sources is a depth direction,
(c) judging for every pixel of said transformed figures whether each pixel is before or behind other pixels in said depth direction, and obtaining existence information relating to which pixels are nearest said light source in each figure based on said judgement results,
(d) judging whether each pixel of each figure is nearest one light source or not in said light source coordinate system, based on said existence information obtained in step (c), and giving lighten intensity information or shadow intensity information as basic information for drawing to a corresponding pixel of each figure having individual data defined in a view reference coordinate system in which a direction of view is the depth direction,
(e) transforming said lighten information or said shadow information obtained in step (d) for each pixel to an intensity value,
(f) storing said transformed intensity value in an intensity memory,
(g) sequentially and repeatedly executing the steps from (b) to (e) for every light source, wherein said transformed intensity values are cumulatively added to said stored intensity values in said intensity memory, and said cumulatively added intensity values are displayed on said CRT-display.

10. A method as set forth in claim 9, wherein said intensity memory is an image memory to be drawn for display on said CRT-display.

11. An apparatus for applying a shadowing operation to figures to be drawn for display on a CRT-display, comprising:
extracting means for extracting figures within a volume to be shadowed from all figures to be drawn to obtain extracted figures, the volume being a volume including desired figures for which shadows may be projected in a view volume,
coordinate transforming means for transforming said all figures to figures having individual data defined in a view reference coordinate system in which a direction of view is a depth direction,
coordinate transforming means for transforming said extracted figures to figures having individual data defined in a light source coordinate system in which a direction of radiation from a light source is a depth direction,
judging means for judging for every pixel of said transformed figures whether each pixel is before or behind other pixels in said depth direction,
memory means for storing individual depth information for pixels judged to be nearest the light source by said judging means,
means for judging for each figure whether, in said memory means, the individual depth information of (i) all pixels of said figure are stored, (ii) only some pixels are stored, or (iii) no pixel is stored, and for generating discrimination data indicating that the entire region, a partial region, or no region of said figure is nearest the light source,
drawing means for drawing figures having discrimination data indicating said figure has a partial region nearest the light source, based on shadow information or lighten information selectively in accordance with said result of judging whether said individual depth information thereof is stored in said memory means, and for drawing figures having discrimination data indicating that the entire region of said figure is nearest the light source side, based on lighten information, and for drawing figures having the discrimination data indicating that said figure has no region nearest the light source, based on shadow information, when figures transformed to the view reference coordinate system are drawn.

12. An apparatus as set forth in claim 11, wherein said individual depth information is priority number data given to each figure previously, and said drawing means includes means for drawing figures of which only some pixels are nearest the light source, based on said lighten information or said shadow information selectively in accordance with said result of judging whether said obtained priority number data of each pixel of each figure to be drawn coincides with said stored priority number data.

13. An apparatus as set forth in claim 11, wherein said individual depth information is a depth value, and said drawing means includes means for drawing figures of which only some pixels are nearest the light source, based on said lighten information or said shadow information selectively in accordance with said result of judging whether said obtained depth value of each pixel of each figure to be drawn in said light source coordinate system coincides with said stored depth value.

14. An apparatus as set forth in claim 11, further comprising,
memory means for storing said figure data and corresponding discrimination data.

15. An apparatus for applying a shadowing operation to figures to be drawn for display on a CRT-display, comprising;
extracting means for extracting figures within a volume to be shadowed from every figure to be drawn to obtain extracted figures, the volume being a volume including desired figures for which shadows may be projected in a view volume,
coordinate transforming means for transforming said all figures to figures having individual data defined in a view reference coordinate system in which a direction of view is a depth direction,
coordinate transforming means for transforming said extracted figures to figures having individual data defined in a light source coordinate system in which a direction of radiation from a light source is a depth direction,
judging means for judging every pixel of said transformed figures whether each pixel is before or behind other pixels in said depth direction, depth information memory means for storing individual depth information for pixels judged to be nearest the light source by said judging means, intensity memory means for storing intensity information for every pixel, said memory means being assigned to each of plural light sources, intensity information generating means for judging whether individual depth information for each pixel of each figure coincides with the depth information stored in said depth information memory means, and for supplying lighten information or shadow information to a corresponding pixel of each figure to be drawn in said view reference coordinate system, intensity information supplying means for supplying said lighten information or said shadow information to said intensity memory means, control means for operating said coordinate transforming means for said light source coordinate system, judging means, intensity information generating means, and intensity information supplying means, for every light source, and intensity calculating means for calculating intensity values of every pixel of figures transformed by said coordinate transforming means for said view reference coordinate system based on said lighten information or said shadow information stored in said intensity memory means.

16. An apparatus as set forth in claim 15, wherein said individual depth information is priority number data given to each figure previously, and said intensity information generating means includes means for supplying said lighten information or said shadow information selectively to each pixel for drawing figures of which only some pixels are nearest the light source, said information corresponding to a result of judging whether said priority number data of each pixel of each figure coincides with said depth information stored in said depth information memory means.

17. An apparatus as set forth in claim 15, wherein said individual depth information is a depth value, and said intensity information generating means includes means for supplying said lighten information or said shadow information selectively to each pixel for drawing figures of which only some pixels are nearest the light source, said information corresponding to a result of judging whether said depth value of each pixel of each figure to be drawn in said light source coordinate system coincides with said one stored in said depth information memory means.

18. An apparatus as set forth in claim 15, wherein said intensity information generating means includes means for supplying flag data indicating whether each pixel is to be shadowed or not as said shadow information or said lighten information, and said memory means comprises plane memories assigned to each light source, thereby storing said flag data in a corresponding plane memory having a size the same as a display screen.

19. An apparatus for applying a shadowing operation to figures to be drawn for display on a CRT-display, comprising;

extracting means for extracting figures within a volume to be shadowed from all figures to be drawn to obtain extracted figures, the volume being a volume including desired figures for which shadows may be projected in a view volume, coordinate transforming means for transforming said all figures to figures having individual data defined in a view reference coordinate system in which a direction of view is a depth direction, coordinate transforming means for transforming said extracted figures to figures having individual data defined in a light source coordinate system in which a direction of radiation from a light source is a depth direction, depth buffer means in said light source coordinate system for storing depth values of every pixel determined to be nearest the light source through judgement for every pixel of each figure whether each pixel is before or behind other pixels in said depth direction based upon every depth value in said light source coordinate system, intensity value memory means for storing intensity values, intensity value generating means for judging whether each pixel is nearest the light source, based on said result of judging whether depth values in said light source coordinate system of every pixel of each figure coincides with said depth values stored in said depth buffer means, and for assigning lighten information or shadow information to each pixel of each figure defined in said view reference coordinate system according to said judgement result, and thereafter transforming said lighten information or said shadow information to an intensity value, intensity value supplying means for supplying said intensity value to said intensity value memory means, control means for operating said coordinate transforming means, said depth buffer means, said intensity value generating means, and said intensity value supplying means, for every light source, and cumulative addition means for performing an adding operation comprising adding said intensity value to be stored in said intensity value memory means to said intensity value already stored in said intensity value memory means, and means for supplying an intensity value obtained by said adding operation in said cumulative addition means to said intensity value memory means.

20. An apparatus as set forth in claim 19, wherein said intensity value memory means is an image memory.

* * * * *